Oct. 13, 1970 — E. C. GLASER — 3,533,681
FOLDING REAR VIEW MIRROR FOR BUS DOOR
Filed Jan. 18, 1968
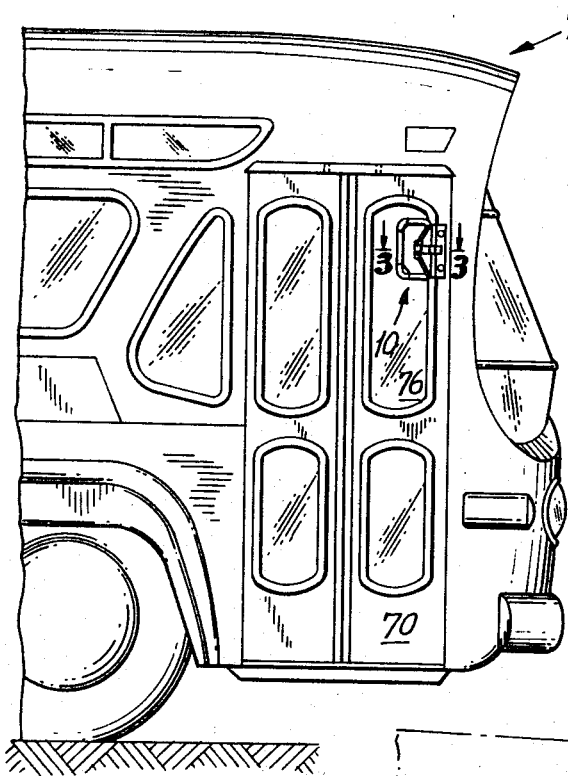
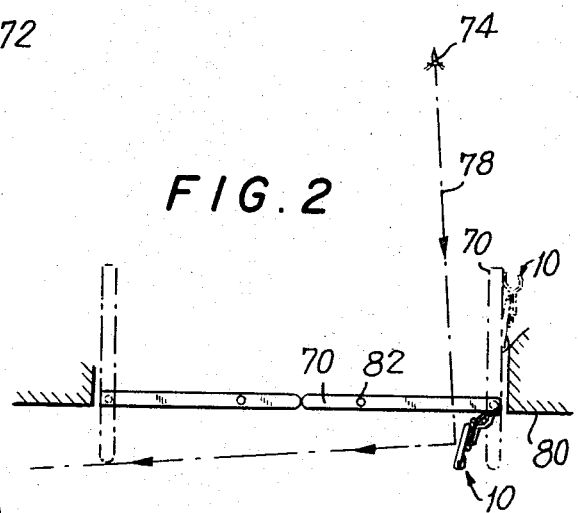
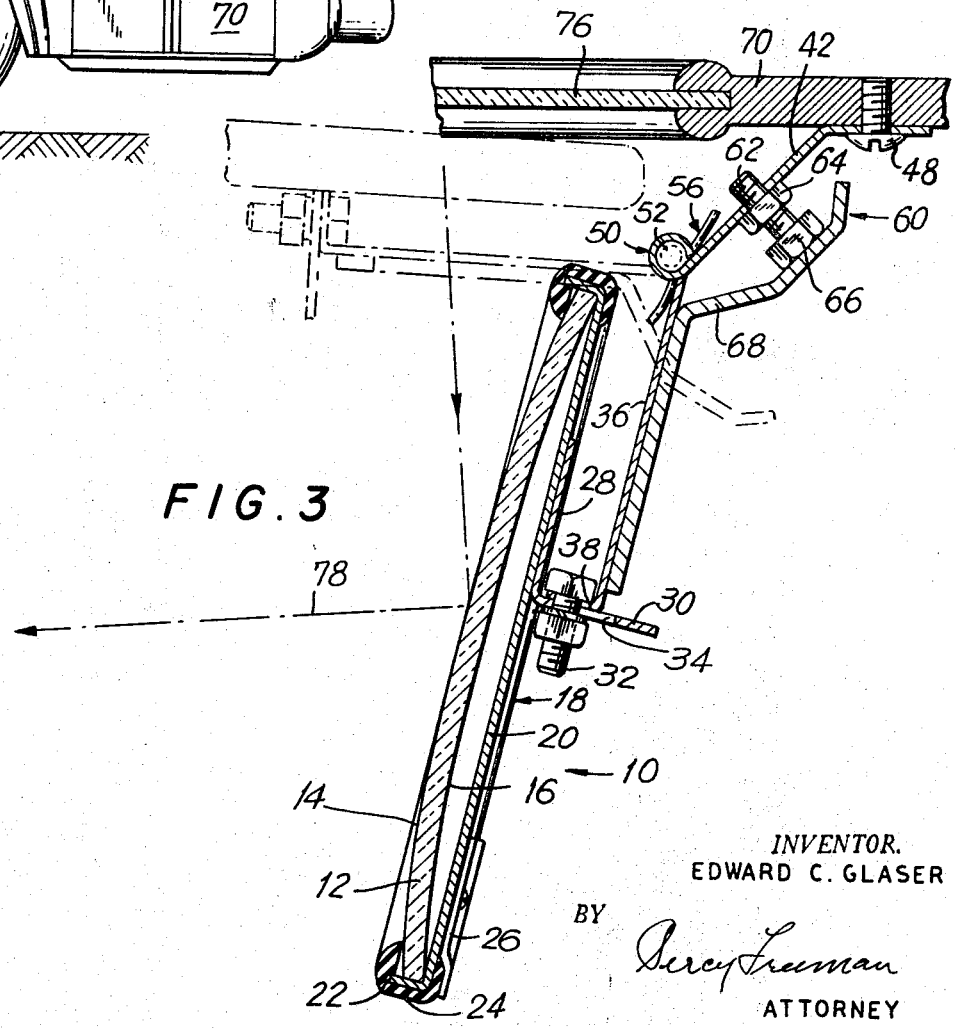
INVENTOR.
EDWARD C. GLASER
BY
Percy Freeman
ATTORNEY

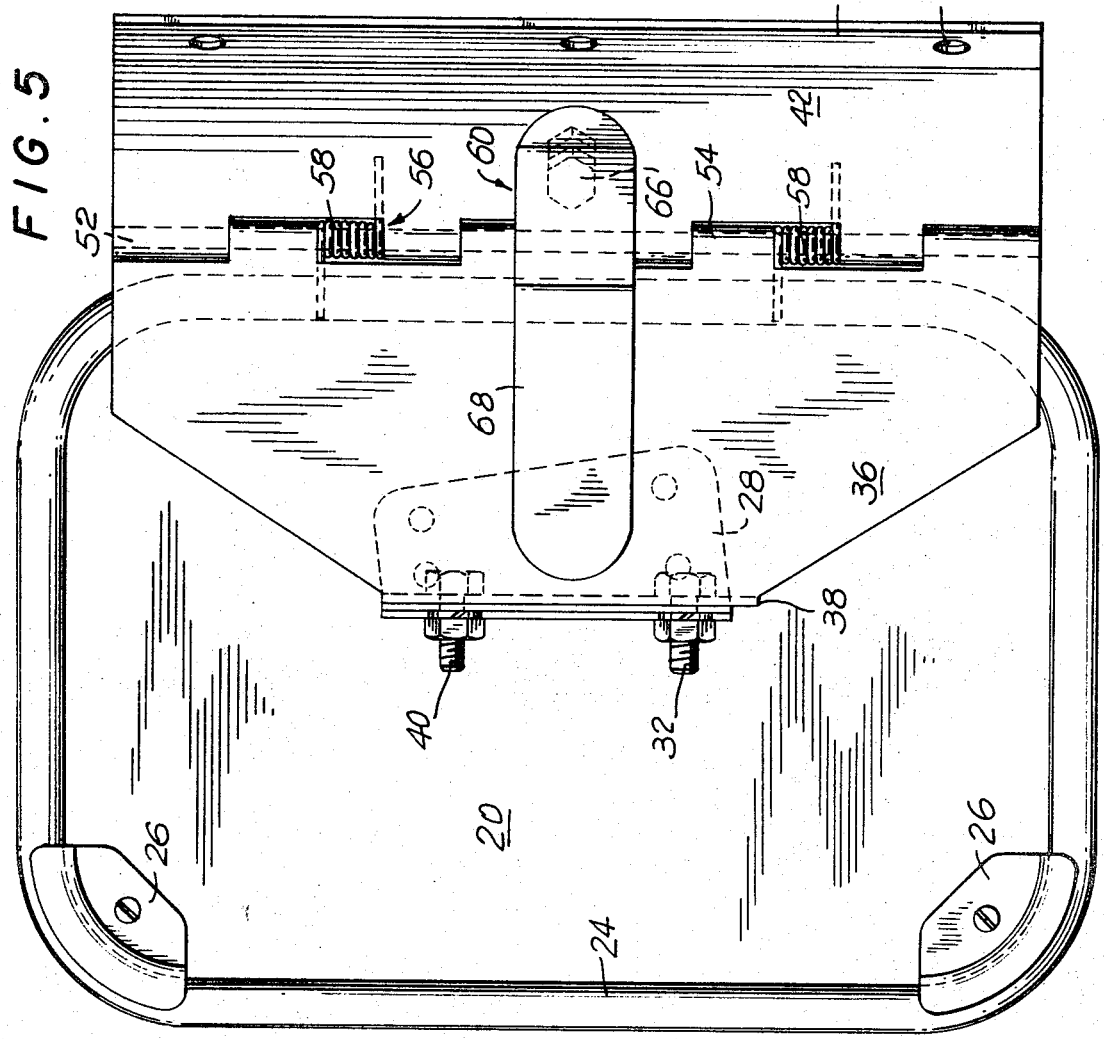
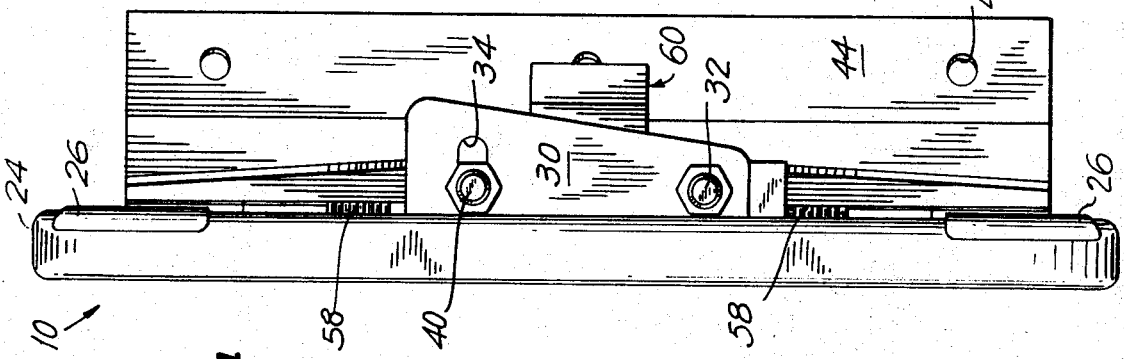

United States Patent Office 3,533,681
Patented Oct. 13, 1970

3,533,681
FOLDING REAR VIEW MIRROR FOR BUS DOOR
Edward C. Glaser, Mekeel St., R.D. 2,
Katonah, N.Y. 10536
Filed Jan. 18, 1968, Ser. No. 698,967
Int. Cl. G02b 5/10; B60r 1/06
U.S. Cl. 350—307                                       5 Claims

ABSTRACT OF THE DISCLOSURE

The present invention pertains to the combination of a viewing assembly and a vehicle, and particularly a bus. The viewing assembly includes a carrier means having a mirror therein and a mounting bracket for mounting the carrier means. The viewing assembly is moveable between two positions corresponding to open and closed positions of the bus doors, and is capable of adjustment about both a vertical and horizontal axis, whereby only an initial adjustment is required to enable the operator of the vehicle to always properly view rearwardly of the vehicle on the passage or entry side thereof.

BACKGROUND OF THE INVENTION

The present invention relates to viewing assemblies and to the combination of a viewing assembly with a vehicle.

In particular, the present invention relates to a viewing assembly which is designed to provide the operator of a vehicle with a view toward the rear. The viewing assembly of the invention may, for example, be mounted at that side of the vehicle which is distant from the operator.

Although viewing assemblies of this general type are known, these known constructions present certain problems particularly in connection with relatively large assemblies which are used on the relatively large vehicles such as trucks or buses. Under these latter conditions the mirror is necessarily positioned at a considerable distance laterally beyond the side of the vehicle which is distant from the operator, so that it sometimes happens that during maneuvering of the vehicle the viewing assembly will strike undesirably against a stationary object or another vehicle resulting in damaging of the structure and possible injury to individuals who are nearby.

Furthermore, it often happens that the best possible position for such a viewing assembly is directly on a side door of the vehicle which is at the front thereof distant from the operator, and because of the fact that the viewing assembly would interfere with the opening and closing movement of this side door, it is not possible to locate the viewing assembly at the optimum location where it will provide the best possible viewing field for the operator of the vehicle.

Additional problems are encountered in connection with the adjustment of the mirror of the viewing assembly so that it can be placed in and reliably retained in a position providing the best possible viewing field.

SUMMARY OF THE INVENTION

It is accordingly a primary object of the present invention to provide a viewing assembly as well as a viewing assembly and vehicle combination which will avoid the above drawbacks.

In particular, it is an object of the invention to provide a viewing assembly which will prevent injury to property and individuals if it should happen that the viewing assembly encounters an obstruction during movement of the vehicle.

Also, it is an object of the invention to provide a viewing assembly and vehicle combination which enables the viewing assembly to be mounted directly on a side door of the vehicle without interfering with the opening and closing movement of the side door.

Furthermore, it is an object of the invention to provide a viewing assembly which can be very accurately adjusted both with respect to a vertical as well as a horizontal axis and which will be reliably maintained in its adjusted position.

Also, it is an object of the invention to provide a viewing assembly which is composed of a relatively small number of rugged, inexpensive components which are easily assembled and which provide a reliable operation under practically any operating conditions.

It is a particular object of the invention to provide a viewing assembly which is especially adapted for use on buses, as well as to provide a viewing assembly-bus combination which will achieve all of the above objects.

In accordance with the invention the viewing assembly includes a mounting bracket and a mirror which has a front face and an opposed back face. A carrier means carries the mirror, and a hinge means hingedly connects the carrier means to the mounting bracket for swinging movement with respect thereto in one direction where the front face of the mirror leads the rear face thereof and in an opposed direction where the rear face of the mirror leads the front face thereof. A spring means coacts with the hinge means, the mounting bracket, and the carrier means to urge the latter to turn about a swing axis determined by the hinge means in the opposed direction where the back face of the mirror leads the front face thereof. A limiting means is carried by the mounting bracket and carrier means to limit swinging movement of the latter by the spring means only in that direction where the back face of the mirror leads the front face thereof, so that the mirror and carrier means are free to swing in opposition to the spring means in that direction where the front face of the mirror leads the rear face thereof. The vehicle has a front side portion distant from the operator of the vehicle to which the mounting bracket is fixed at an attitude which provides a substantially vertical swing axis for the carrier means and mirror as determined by the hinge means and which directs the front face of the mirror toward the rear.

BRIEF DESCRIPTION OF DRAWINGS

The invention is illustrated by way of example in the accompanying drawings which form part of this application and in which:

FIG. 1 is a fragmentary schematic side elevation of the front side portion of a bus which is distant from the operator of the bus and which is provided with the schematically illustrated viewing assembly of the invention;

FIG. 2 is a schematic partly sectional plan view illustrating how the bus door is opened and closed, how the viewing assembly is influenced by the opening and closing movement of the bus door, and how the operator achieves through the viewing assembly a viewing field which is directed toward the rear;

FIG. 3 is a fragmentary sectional plan view taken along line 3—3 of FIG. 1 in the direction of the arrows, and showing details of the structure of the invention at a scale which is enlarged as compared to FIG. 1;

FIG. 4 is an end elevation of the viewing assembly of the invention as seen from the left of FIG. 5; and FIG. 5 is a rear elevation of the viewing assembly of the invention as seen from the right of FIG. 4.

DESCRIPTION OF A PREFERRED EMBODIMENT

Referring now to the drawings, reference is first made to FIGS. 3–5 where the details of the viewing assembly 10 of the invention are illustrated. As may be seen from FIG. 3 the viewing assembly 10 includes a convex mirror 12 having a rearwardly directed convex face 14 and a forwardly directed concave rear face 16. Because of its convex construction the mirror 12 not only provides a particularly effective viewing field, but in addition it will when adjusted both horizontally and vertically for one individual remain properly adjusted for other individuals.

The mirror 12 is carried by a carrier means 18 which includes a receptacle 20 having a flat rear wall toward which the back face 16 of the mirror is directed and an endless side flange 22 projecting forwardly from the flat rear wall of the receptacle 20 and closely surrounding and projecting slightly forwardly beyond the endless side edge of the mirror 12. Thus, the mirror 12 is situated in the receptacle 20 in the manner shown most clearly in FIG. 3, and it will be noted that the carrier means 18 carries the mirror 12 with its front face 14 substantially entirely exposed. A shock-absorbing ring 24 surrounds and engages the flange 22, has a front lip overlapping the front peripheral portion of the mirror 12, and has a rear lip overlapping the forwardly directed outer peripheral edge portion of the rear flat wall of the receptacle 20. A pair of clips 26 are releasably fastened to rear wall of the receptacle 20 for releasably securing the ring 24 on the receptacle 20. These clips are situated at the outer top and bottom corners of the receptacle 20, as is apparent from FIG. 5.

The mounting means 18 further includes a substantially rigid mirror bracket 28 which is in the form of an elongated metallic angle member having one flange secured directly to the outer surface of the flat wall of the receptacle 20 and having a second flange 30 extending substantially perpendicularly with respect to the mirror 12 in a substantially vertical direction. This flange 30 of the mirror bracket 28 is formed with a lower opening through which a pivot bolt 32 extends as indicated in FIGS. 4 and 5. The flange 30 tapers in a downward direction, as shown in FIG. 4, and at an upper portion it is provided with elongated substantially horizontal slot 34 which may extend along an arc of a circle whose center is in the axis of the pivot bolt 32.

The carrier means 18 also includes a hinge bracket 36 which has at one end an elongated substantially vertical flange 38 overlapping and engaging the flange 30 and thus also extending substantially perpendicularly with respect to the mirror 12. This flange 38 of the hinge bracket 36 is formed with a lower opening registering with the lower opening of the flange 30 and through which pivot bolt 32 also extends. The head of this bolt 32 engages the flange 38 while the threaded shank thereof carries a lock washer engaging the flange 30 and a nut engaging the lock washer, so that once the flange 30 has been angularly adjusted with respect to the flange 38, this adjusted position can be maintained. The flange 38 of the hinge bracket 36 is provided with an opening which registers with the slot 34, and a releasable holding bolt 40 extends through the opening at the upper portion of the flange 38 and has its head engaging the latter. The threaded shank of the bolt 40 extends through and beyond the slot 34 and carries a lock washer and nut, as indicated in FIGS. 4 and 5. Thus, when the nut on the bolt 40 is loosened and the nut on the bolt 32 is loosened, it is possible to displace the slot 34 with respect to the bolt 40 while angularly adjusting the mirror with respect to the horizontal pivot axis of the pivot bolt 32, and when the adjusted position with respect to this latter horizontal axis is achieved, the nuts on the bolts 32 and 40 are tightened to maintain the parts in their angularly adjusted position. Thus, these components 32 and 40 together with the coacting portions of the brackets 28 and 36 form an angular adjusting means for angularly adjusting the mirror with respect to a horizontal axis.

The viewing assembly 10 further includes a substantially rigid mounting bracket 42 having along one angular edge portion 44 openings 46 to receive mounting screws 48. The mounting bracket 42 and the hinge bracket 36 of the carrier means 18 are interconnected by a hinge means 50 which includes a substantially vertical hinge pin 52 and coaxially aligned hinge sleeve portions 54 integral with and projecting from brackets 36 and 42 and through which the hinge pin 52 extends to form the hinge means 50. Thus, the hinge means 50 connects the carrier means 18 to the mounting bracket 42 for swinging movement about a substantially vertical swing axis, coinciding with the axis of hinge pin 52, in one direction where the front face 14 of the mirror leads the back face 16 thereof and in an opposed direction where the back face 16 of the mirror leads the front face 14.

A spring means 56 coacts with the hinge means 50, the mounting bracket 42 and the carrier means 10 for urging the latter in that direction were back face 16 of the mirror leads the front face 14 thereof. This spring means 56 in the illustrated example takes the form of a pair of coil springs 58 respectively coiled about portions of the hinge pin 52 and having free ends engaging the bracket 36 and the mounting bracket 42 so as to urge the bracket 36 to turn in a counterclockwise direction about the hinge pin 52, as viewed in FIG. 3.

A limiting means 60 is provided for limiting the swinging of the carrier means 18 by the spring means 56. This limiting means includes a limiting bolt 62 threaded through a tapped opening of the mounting bracket 42 and carrying a lock nut 64, while the head end 66 of the limiting bolt 62 is engaged by a substantially rigid metallic limiting member 68 fixed to the bracket 36 and having an elongated portion projecting from the bracket 36 and engaging the head end 66 of the limiting bolt 62 in the manner shown in FIG. 3. Thus, with this construction the limiting means 60 limits the swinging of the carrier means 18 and mirror 12 only in a counter-clockwise direction, as viewed in FIG. 3, while the carrier means 18 and mirror 12 are free to swing in opposition to the spring means 56 in a clockwise direction, as viewed in FIG. 3, to the dot-dash line position fragmentarily illustrated in FIG. 3, for example.

It is to be noted that the limiting means 60 serves the additional function of adjusting the angular position of the mirror 12 with respect to the vertical axis of the hinge means 50. Thus, by loosening the lock nut 64 and turning the limiting bolt 62 it is possible to determine the position of the head 66 and thus determine the end position of the mirror where the limiting member 68 engages the head 66. This will of course adjust the mirror with respect to the vertical axis of the hinge means 50, and when this latter adjustment is achieved the lock nut 64 is tightened, so that in this way a simple structure is provided for adjusting the mirror angularly with respect to a vertical axis.

Referring to FIG. 1, it will be seen that the viewing assembly 10 of the invention is mounted directly on a door 70 of a bus 72 at that front side portion of the vehicle 72 which is distant from the operator whose eye 74 is indicated in FIG. 2. Thus, the operator will look toward the mirror 12 and see the rear view when the door 70 is closed by viewing the mirror 12 through the window 76 of the door 70, and the viewing path 78 is indicated in dot-dash lines in FIGS. 2 and 3. The fastening screws 48 fasten the mounting bracket 42 directly on the door 70 adjacent to the door frame portion 80 at a convenient elevation. The top and bottom edges of the door 70 fixedly carry coaxial guide pins 82 guided in suitable slots so that when the door 70 is opened it swings inwardly at its right edge, as viewed in FIGS. 1 and 2, to the dot-dash line position. This will of course swing the entire viewing assembly 10 of the invention inwardly against the door frame portion 80, and this door frame portion simply engages the carrier means 18 and displaces the latter in opposition to the spring means 56 to a location where the mirror 12 is located closely adjacent to the window 76, as shown in dot-dash lines in FIG. 2. In this way the viewing assembly 10 of the invention does not in any way interfere with the opening and closing movement of the door 70.

Furthermore, it will be noted that when the door 70 is in its closed position, the carrier means 18, if it should engage an obstruction during forward movement of the vehicle, can simply swing in opposition to the spring means 56 to the dot-dash line position shown in FIG. 3, so that in this case also there will be no injury to the structure or to any individuals nearby.

In is apparent, therefore, that with the structure of the invention it is possible to provide a viewing assembly-vehicle combination where the viewing assembly is mounted directly on a door of the vehicle without interfering with the opening and closing movement thereof so that it is possible to locate the viewing assembly at the best possible location to provide the best possible viewing field. Furthermore, there will be no injury to any components or individuals if the structure should encounter an object during movement of the vehicle. Also, it is extremely convenient to adjust the mirror 12 with respect to a horizontal axis as well as with respect to a vertical axis, in the manner described above, so that the best possible adjusted position can be achieved for the viewing assembly 10.

What is claimed is:

1. In combination with a vehicle having a corner post and a front passenger door assembly comprising at least two doors which are opened and closed in a translating and rotating manner such that said doors are in a butted, in-line position with respect to one another when closed and in oppositely disposed parallel planes when opened; a viewing assembly comprising a mirror, a carrier means having a mirror bracket for holding said mirror, hinge means comprising a pair of hinge elements connected together along a pivot axis, biasing means coacting with said hinge elements, and urging said hinge elements together toward a closed position, means secured to one of said hinge elements for limiting the swinging movement of said other hinge element so that said hinge elements are precluded from being urged together towards a closed position by said biasing means, means for securing one of said hinge elements to said door juxtaposed to said corner post, and means for securing said other of said hinge elements to said mirror bracket, said means secured to one of said hinge elements being adjustable for adjusting the angular position of said mirror with respect to a vertical axis, whereby said viewing assembly is disposed in a normal operating or viewing position when said doors are closed, and in a substantially parallel position against one of said doors when said doors are open, said viewing assembly bearing against said door post during the opening of said doors such that said hinge elements are urged apart against said biasing means towards an open position.

2. The combination according to claim 1, wherein said carrier means has a resilient annular element surrounding the periphery of said carrier means and said mirror.

3. The combination according to claim 1, wherein said adjustable means comprises a threaded nut and bolt assembly carried by said hinge element.

4. The combination according to claim 1, wherein said mirror bracket and said other of said hinge elements respectively having a slidable engagement with each other, a pair of overlapping flanges which extend substantially perpendicularly with respect to said mirror, said means for pivoting or adjusting said mirror about a horizontal axis extending through and pivotably interconnecting said overlapping flanges, one of said flanges being formed with an opening and the other of said flanges being formed with an elongated slot which registers with said opening.

5. The combination according to claim 1, including angular adjusting means interconnecting said mirror bracket of said carrier means and said other of said hinge elements, whereby said mirror may be adjusted about a horizontal axis.

References Cited

FOREIGN PATENTS

| 775,594 | 5/1957 | Great Britain. |
| 1,265,696 | 1961 | France. |

DAVID SCHONBERG, Primary Examiner

J. W. LEONARD, Assistant Examiner

U.S. Cl. X.R.

49—70; 248—486; 350—293